Dec. 26, 1933.  M. CIAMPA  1,941,164
DEVICE FOR EXTRACTING JUICES FROM FRUITS
Filed Jan. 7, 1932
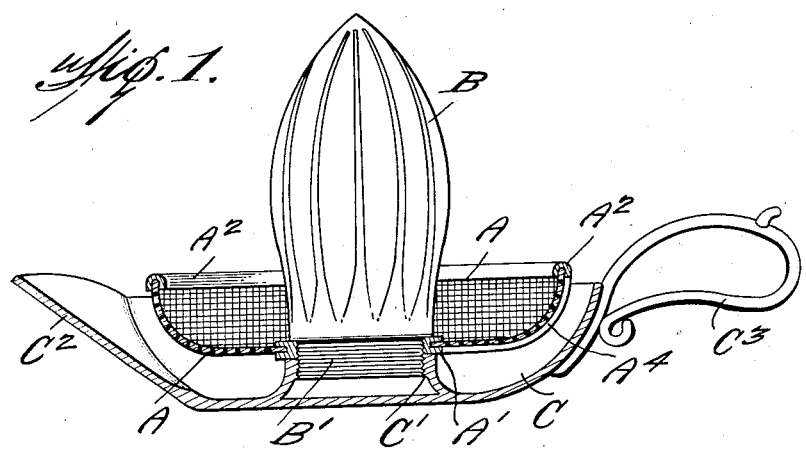
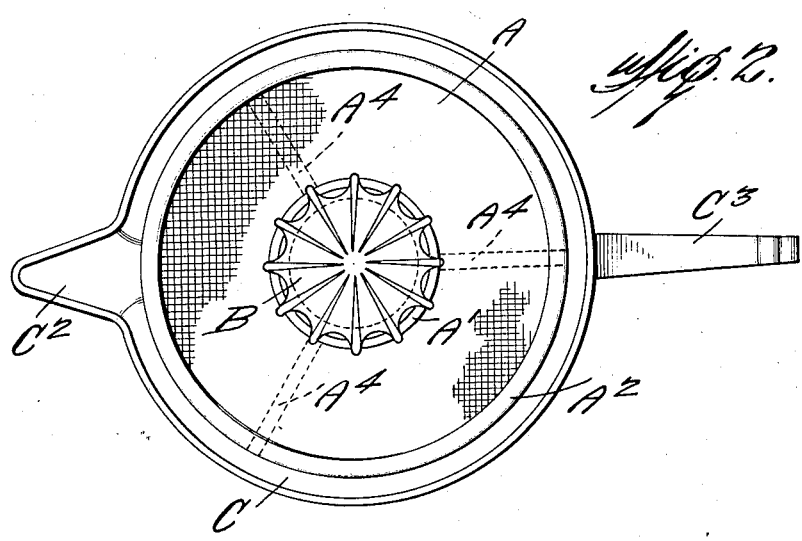
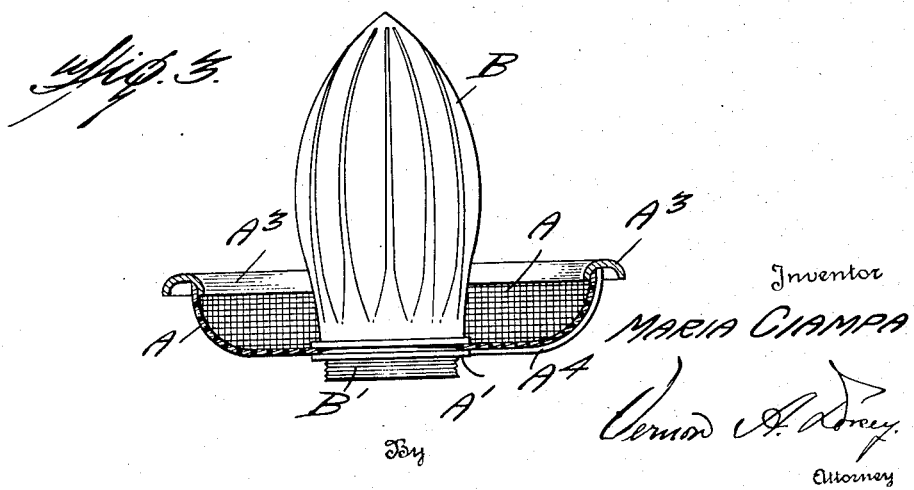
Inventor
MARIA CIAMPA Patented Dec. 26, 1933

1,941,164

UNITED STATES PATENT OFFICE 1,941,164

DEVICE FOR EXTRACTING JUICES FROM FRUITS

Maria Ciampa, London, England

Application January 7, 1932, Serial No. 585,355, and in Great Britain May 7, 1931

1 Claim. (Cl. 146—3)

This invention relates to devices for domestic use in squeezing the juice from oranges, lemons and like fruits and has for its object to provide an improved construction and arrangement whereby seeds and other solid matter are effectively prevented from entering the receptacle provided for the liquid.

The invention is applicable to devices of the kind in which a central cone projects upwardly from the center of a tray or dish and is surrounded by a strainer, the fruit being pressed over the apex of the cone so that the juice flows therefrom through the strainer into the receptacle surrounding the base of the cone.

According to the present invention the strainer consists of an annular piece of gauze preferably of 32 mesh to the inch this gauze being fixed between the central cone and the upper lip or rim of a receptacle in the centre of which the cone may be fixedly or detachably mounted. This strainer whilst allowing juice to pass freely and quickly, prevents the passage of even small seeds or the tiniest portion of fruit pulp.

The cone may be formed with outwardly projecting lugs or radial ribs may extend between the cone and the lip of the receptacle for the purpose of supporting the strainer in the desired position.

The receptacle may be provided with a pouring lip or spout and also a handle to facilitate use. This receptacle may be formed with an upwardly extending boss with which the lower portion of the cone is adapted to be detachably connected preferably by means of a screw thread.

The cone, with the strainer can be detached from the base for use as a separate unit for example, by mounting the strainer on top of a tumbler so that the fruit juice can be squeezed directly through the strainer into the tumbler. For this purpose the rim of the strainer may be downwardly turned or otherwise formed to enable it to be readily engaged with the upper edge of the tumbler.

Referring to the accompanying drawing:—

Fig. 1 is a sectional elevation of a device constructed in accordance with or embodying the present invention.

Fig. 2 is a plan of the device shown in Fig. 1.

Fig. 3 is a sectional elevation showing a modified construction of the device.

Referring to the device shown in Figs. 1 and 2 A is the strainer, B the cone or dome and C the base or juice receiving dish or receptacle.

In this embodiment of the invention the strainer A which consists of a piece of fine wire gauze say of 32 mesh to the inch, is furnished with, or mounted in, a ring $A^1$ internally screw-threaded so that it may be detachably screwed on to the threaded base, of the cone B. At its upper edge the strainer is provided with a metal or other smooth rim $A^2$.

The cone B which projects to an appropriate distance above the dish or base C and strainer A may be ribbed, fluted or otherwise formed and terminates in a threaded boss or the like of $B^1$ which is adapted to screw into a central upstanding boss $C^1$ on the dish or receptacle C.

When the dome or cone B is screwed into position, the ring $A^1$ is firmly secured between the upper end of the boss $C^1$ and the lower end of the cone B.

This dish C is conveniently provided with a spout $C^2$ and the handle $C^3$.

The strainer A may be provided with strengthening or supporting ribs $A^4$.

This embodiment of the invention is particularly suitable for table or other use where it is desirable to retain the extracted or expressed juice and pour it into another vessel, or when it is desired to pour portions of this juice into several vessels.

The strainer is sufficiently deep to retain the seeds, pulp or the like and to prevent them being spilled when the device is tilted to pour off the juice.

The device may be used without the juice receiving dish or base C and may be placed on the top of any convenient form of dish or utensil which will form the base and which is capable of receiving the juice after it passes through the strainer A. In this case the strainer A (see Fig. 3) is conveniently furnished with an over-hanging lip of rim $A^3$ adapted to rest upon and preferably engage the upper edge of a tumbler, glass or other appropriate vessel into which the juice can pass directly from the strainer.

What I claim is:—

In a juice extracting device, a combination of the cone having threads on its lower end, a strainer of gauze having a ring mounted therein, said ring being threaded with and engaging the threads on the lower end of the cone, and an overhanging rim at the periphery of the gauze, said rim and gauze being strengthened by ribs extending out from beneath the ring.

MARIA CIAMPA.